(12) United States Patent
Boese et al.

(10) Patent No.: US 9,317,915 B2
(45) Date of Patent: Apr. 19, 2016

(54) COMPUTED-TOMOGRAPHY SYSTEM AND METHOD FOR DETERMINING VOLUME INFORMATION FOR A BODY

(71) Applicants: Antje Schulte; Reinhard Boese; Ursula Boese

(72) Inventors: Jan Boese, Eckental (DE); Yu Deuerling-Zheng, Forchheim (DE); Sabine Heiland, Heidelberg (DE); Martin Wagner, Heidelberg (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 535 days.

(21) Appl. No.: 13/680,318

(22) Filed: Nov. 19, 2012

(65) Prior Publication Data
US 2013/0129172 A1 May 23, 2013

(30) Foreign Application Priority Data
Nov. 22, 2011 (DE) .......................... 10 2011 086 771

(51) Int. Cl.
| | | |
|---|---|---|
| *G06K 9/00* | (2006.01) | |
| *A61B 6/00* | (2006.01) | |
| *G06T 7/00* | (2006.01) | |
| *G06T 11/00* | (2006.01) | |

(52) U.S. Cl.
CPC .............. *G06T 7/0012* (2013.01); *G06T 11/003* (2013.01)

(58) Field of Classification Search
None
See application file for complete search history.

(56) References Cited

U.S. PATENT DOCUMENTS

| | | | | |
|---|---|---|---|---|
| 5,852,646 | A | * 12/1998 | Klotz et al. | ........................ 378/8 |
| 6,049,582 | A | 4/2000 | Navab | |
| 6,768,782 | B1 | * 7/2004 | Hsieh et al. | ........................ 378/8 |
| 8,571,287 | B2 | * 10/2013 | DeMan et al. | ................. 382/131 |
| 2003/0156746 | A1 | * 8/2003 | Bissell et al. | .................... 382/128 |
| 2004/0264625 | A1 | * 12/2004 | Basu et al. | ........................ 378/4 |
| 2005/0259780 | A1 | * 11/2005 | Goodgame | ........... G06T 11/006 378/4 |
| 2007/0297656 | A1 | 12/2007 | DeMan | |

(Continued)

FOREIGN PATENT DOCUMENTS

| | | |
|---|---|---|
| CN | 1517807 A | 8/2004 |
| CN | 101095165 A | 12/2007 |

OTHER PUBLICATIONS

Ranganathan, "The Levenberg-Marquardt Algorithm", Tutorial on LM Algorithm, 2004, pp. 1-5.*

(Continued)

*Primary Examiner* — Matthew Bella
*Assistant Examiner* — Jose M Torres

(57) ABSTRACT

A tomogram of a body is provided. Projection-image data obtained by a radiation-based projection method is used for providing the tomogram. Initial voxel data are first specified for a plurality of voxels of the body. Synthetic projection-image data are generated based upon a projection rule modeling a course of the projection method. Projection-error data is determined by comparing the synthetic projection-image data with the real projection-image data. The projection-error data are imaged on the basis of a back-projection rule dependent on the projection rule so that voxel-error data are produced. Correction data is generated from the voxel-error data by a gradient-based optimizing algorithm, wherein corrected voxel data are generated using the correction data.

12 Claims, 2 Drawing Sheets

(56) References Cited

U.S. PATENT DOCUMENTS

| | | | |
|---|---|---|---|
| 2008/0270465 A1* | 10/2008 | Vija et al. .................. | 707/103 Y |
| 2009/0052760 A1* | 2/2009 | Smith et al. .................. | 382/132 |
| 2012/0027280 A1* | 2/2012 | Ramirez Giraldo et al. . | 382/131 |
| 2013/0002659 A1* | 1/2013 | Jiang ..................... | G06T 11/006 345/419 |

OTHER PUBLICATIONS

Bruyant, "Analytic and Iterative Reconstruction Algorithms in SPECT", The Journal of Nuclear Medicine, 2002; 43:1343-1358.*

Christoph Neukirchen et al., An Iterative Approach for Model-Based Tomographic Perfusion Estimation, Proc. Fully 3-D, 2007, pp. 104-107; Others; 2007.

Ramirez-Giraldo et al.; Nonconvex prior image constrained compressed Sensing (NCPICCS): Theory and simulations on perfusion CT Medical Physics (2011), vol. 38, No. 4, p. 2157-67. (44 refs.) CODEN: MPHYA6 ISSN 0094-2405; Others; 2011.

Neukirchen et al.: "An iterative method for tomographic x-ray perfusion estimation in a decomposition model-based approach", in: Medical Physics (2010), vol. 37, No. 12, pp. 6125-6141; Magazine; 2010.

Sunnegardh, J.: Iterative Filtered Backprojection Methods for Helical Cone-Beam CT. Linköping Studies in Science and Technology, Dissertation No. 1264, 2009, pp. 4-8,45-48, 83-87.; Book.

Bruyant P.: "Analytic and Iterative Reconstruction Algorithms in SPECT*"; The Joural of Nuclear Medicine; Society of Nuclear Medicine US; vol. 43 No. 10; pp. 1343-1358; XP002440964; ISSN: 0161-5505.

* cited by examiner

COMPUTED-TOMOGRAPHY SYSTEM AND METHOD FOR DETERMINING VOLUME INFORMATION FOR A BODY

CROSS REFERENCE TO RELATED APPLICATIONS

This application claims priority of German Patent Application No. 10 2011 086 771.6 DE filed Nov. 22, 2011. All of the applications are incorporated by reference herein in their entirety.

FIELD OF INVENTION

A method for determining volume information for a body is provided, wherein projection-image data are used which were produced by a radiation-based projection method. Further, a computed-tomography system is provided.

BACKGROUND OF INVENTION

Image information about a body's internal structure may be determined non-invasively by radiation-based projection methods, for example computed tomography. The body may be the body of a patient, for example, whether human or animal. An inanimate object such as, for instance, a sample of material or a machine, may also be understood here as a body.

To be able to mutually differentiate the body's individual constituents, differences in said constituents are used in regard of their absorption characteristics in terms of the radiation with which the body is irradiated within the scope of the projection method. The body is therein thought of as being divided into what are termed voxels, which are small volume elements. For each of said voxels the absorption characteristic of the material located therein is then determined based on the projection-image data. The totality of such "attenuation values" for the individual voxels is here referred to as voxel data.

The voxel data are obtained by irradiating the body with the radiation from different directions and registering a projection image for each of said irradiating operations on a projection surface by means of, for example, electronic pixel sensors. Said projection images then each constitute a shadow of the body's individual elements. The projection-image data is nowadays usually assembled into a two-dimensional tomogram by means of what is termed filtered back projecting so that inferences may be made from the plurality of projection images about the nature of the body's materials in the individual voxels, i.e. the voxel data.

Filtered back projecting requires that the characteristics of the body's individual volume elements do not to change while the projection images are being recorded, often in succession, which means that the voxel data are independent of time. Hence, with that method it is not possible, for example, to show functionally, which is to say dynamically, how a contrast medium spreads along a patient's blood vessels. There being just a single projection image for each perfusion state of the contrast medium in the body, artifacts may appear during reconstructing of a tomographic image due to the temporal change in the voxel data.

An alternative approach to back projecting is offered using an algebraic reconstruction technique (ART). With that method it is possible to take account of there only ever being one projection image for a specific perfusion state of a contrast medium. An example of an ART algorithm of such kind is the method described in the work published by Neukirchen et al. (C. Neukirchen, M. Giordano, and S. Wiesner, "An Iterative Method for Tomographic X-ray Perfusion Estimation in a Decomposition Model-Based Approach": Medical Physics, vol. 37, no. 12, pp. 6125-6141, December 2010). It is a method whereby the time-dependency of the voxel data representing the blood vessels in a patient's body is determined on the basis of a principal component analysis (PCA). The PCA is here used for determining basic functions for the course of the voxel values over time so that the time-dependent attenuation value in each voxel can then be described by superimposing said basic functions.

SUMMARY OF INVENTION

An object is to provide a tomogram of a body, which tomogram is as free as possible from artifacts. The object is achieved by a method and a computed-tomography system as claimed in the independent claims. Advantageous developments of the method are described in the dependent claims.

The method processes projection-image data obtained by a radiation-based projection method, for example computed tomography. Volume information is obtained about individual voxels of the body, which is information about the material of the body in the individual voxels in terms of an interaction between said material and the radiation employed.

At a first step, initial voxel data are specified for a plurality of voxels of the body. Said data may be values that are independent of the real measurement, for example zeroes, or a mean value computed from the projection-image data.

Synthetic projection-image data are then generated from the initial voxel data. The projection rule employed is, for instance, a projection matrix, models the course of the projection method via which the real projection-image data was obtained. For each real projection image, a corresponding, synthetic projection image recorded from the same beam direction as the real projection image will thus be produced from the initial voxel data.

At another step of the method, the synthetic projection-image data are compared with the real projection-image data. The determined differences form projection-error data serving as a measure of the extent to which the initial voxel data diverges from the body's real voxel data requiring being determined.

According to the method, said projection-error data, which has been determined for the individual projection images, is combined into voxel-error data on the basis of a back-projection rule. Said back-projection rule constitutes a reversal of the projection rule that was mentioned, although it does not have to be a distinct reversal.

Once the voxel-error data relating to the individual voxels is available, correction data for the individual voxels is determined at another step of the method by a gradient-based optimizing algorithm. Corrected voxel data describing the real situation prevailing in the body better than the initial voxel data is determined on the basis of said correction data.

The method has the advantage that tomograms may be produced which have significantly fewer image artifacts than, for example, tomograms produced by filtered back projecting.

The method also allows a time dependency of the voxel data to be taken into account so that functional representations, such as are necessary, for example, for visualizing a perfusion of a contrast medium in a living body, will also be possible. Account may likewise be taken of breathing movements or other local displacements of individual elements of the body. For that purpose, a development of the method provides a mathematical model for describing a time dependency of the voxel data to be defined for at least one voxel of the body. Said model includes at least one model parameter.

Update vector data forming correction data by means of which the at least one model parameter is updated may then be determined for a parameterized model of such kind on the basis of the gradient-based optimizing algorithm.

An embodiment allows the cited visualizing of perfusion processes and for that purpose provides for the model to indicate a mathematical time-dependency of a contrast-medium concentration. The mathematical model may be formed on the basis of a gamma-variate function or gamma distribution.

Particularly high-contrast representations may be provided if projection images recorded under at least two different measuring conditions are available. A possible example is firstly to record the projection images before a contrast medium is injected and then to repeat the recording during the injection process. Once projection images produced under different measuring conditions are available, then according to a development of the method, projection-image data of one of the projection images will be subtracted as what is termed a baseline from the other projection image's projection-image data or a constant offset value will be determined there from for the described mathematical model. Temporal changes will then be rendered particularly prominent thereby.

The method may be realized on the basis of different gradient-based optimizing algorithms. Examples include the Newton method and Gauss-Newton method. The Levenberg-Marquardt method is suitable in connection with projection-image data relating to human or animal bodies for obtaining tomograms having few artifacts. Said method may be implemented efficiently in terms of memory.

As already described, very easily determined initial values may be used as initial voxel data. It is also possible to receive voxel data starting with zero values. Use of filtered back-projecting in providing initial voxel data has proved surprisingly expedient. The method, which is to be counted among the ART methods, may in other words be combined with filtered back-projecting when the initial voxel data is being provided. Thus, blood-vessel and tissue voxels may during initializing first be coarsely segmented using a conventional reconstructing method (such as filtered back-projecting just cited). In each case, a mean vessel or, as the case may be, tissue curve describing the temporal curve of the intensity values may then be computed for the initializing process.

The method is designed for iteratively improving the voxel data. The sequence of method-specific steps is for that purpose performed repeatedly. For each repetition the respectively previously determined corrected voxel data are specified as the initial voxel data. A degree of error that is dependent on the projection-error data is thus iteratively reducible, meaning that the voxel data will describe to an ever greater extent the situation prevailing in the body.

What the gradient-based optimizing algorithm therein does is as a function of the projection-error data to in each case determine correction values for the individual items of voxel data themselves or for model parameters by means of which the improved voxel data are then computed using a model. The correction values are in the simplest case added to the current values (voxel values or model-parameter values). What the magnitude of said correction values may be is, in the case of a gradient-based optimizing algorithm, as a rule determined by what is termed a step size of the algorithm. It is therein customary to start with a large step size and to reduce it as the number of repetitions or iterations increases when the algorithm starts converging. What, though, has proved particularly expedient in connection with the method is a development wherein a first, relatively small value is initially set for a step size of the gradient-based optimizing algorithm for a predefined number of repetitions of the sequence of method-related steps. A second value that is greater than the first is not set until afterwards for succeeding repetitions. A particularly good convergence characteristic of the optimizing algorithm may be achieved in that way in connection with projection-image data.

All voxel-error data is as a rule fed to the gradient-based optimizing algorithm to allow all available error information to be included in determining the correction data. Ever smaller values for the correction data will therein be obtained with the optimizing algorithm approaching a (local or global) error minimum as the sequence of method-related steps is repeated. Iterative computing of the voxel data may be immediately followed by a correction phase of the method to prevent the algorithm from therein aiming only for a local optimum leaving an error in the voxel data unable to be corrected by means of the optimizing algorithm. In said correction phase, voxel-error data are first in the manner already described again determined from initial voxel data which may be, for example, corrected voxel data from a previous iteration. Instead, though, of then using all said voxel-error data for computing further correction data, an analysis of the voxel-error data is first performed in the correction phase. Only a subset of the voxel-error data is therein determined for an ensuing computation of further correction data. All voxel-error data meeting a predefined criterion is selected for that purpose. The set of voxel-error data having negative values is therein a particularly suitable subset. The correction data are then at a succeeding step computed only on the basis of said subset, which in trials resulted in improved voxel data.

The method may also be implemented very efficiently in terms of memory. Thus a development of the method provides for storing not the voxel-error data itself but a product formed from the voxel-error data and from a Jacobi matrix in a memory belonging to the data-processing device by which the method is performed. A Jacobi matrix of such kind is as a rule a constituent of a gradient-based optimizing algorithm. When the correction data is being computed, as a rule only said product is required that is formed from the Jacobi matrix and voxel-error data and produces a result vector requiring significantly less memory space than the vector of the voxel-error data itself.

The memory requirements may be reduced even further by computing the correction data from the voxel-error data numerically on the basis of a Cholesky factorization. Said computing may be implemented as what is termed an in-place calculation (data-substituting calculation).

Voxel-data computing may be accelerated in the case of projection-image data about which it is known that it represents images of a body that was not significantly moved during the recording process. It will then be possible to compute voxel data simultaneously for different voxels on two different processor cores because the voxel data for a specific voxel does not have to be taken into account for computing another voxel's voxel data. The voxel data will then be mutually independent.

Computed tomography, especially C-arm computed tomography, and positron-emission tomography have proved particularly suitable as radiation-based projection methods for obtaining the projection-image data.

In this connection, another aspect relates to a computed-tomography system, in particular a C-arm computed-tomography system, in which an x-ray detector is coupled to a data-processing device, for example a personal computer, which is equipped for implementing an embodiment of the method.

DETAILED DESCRIPTION OF INVENTION

Figure 1:
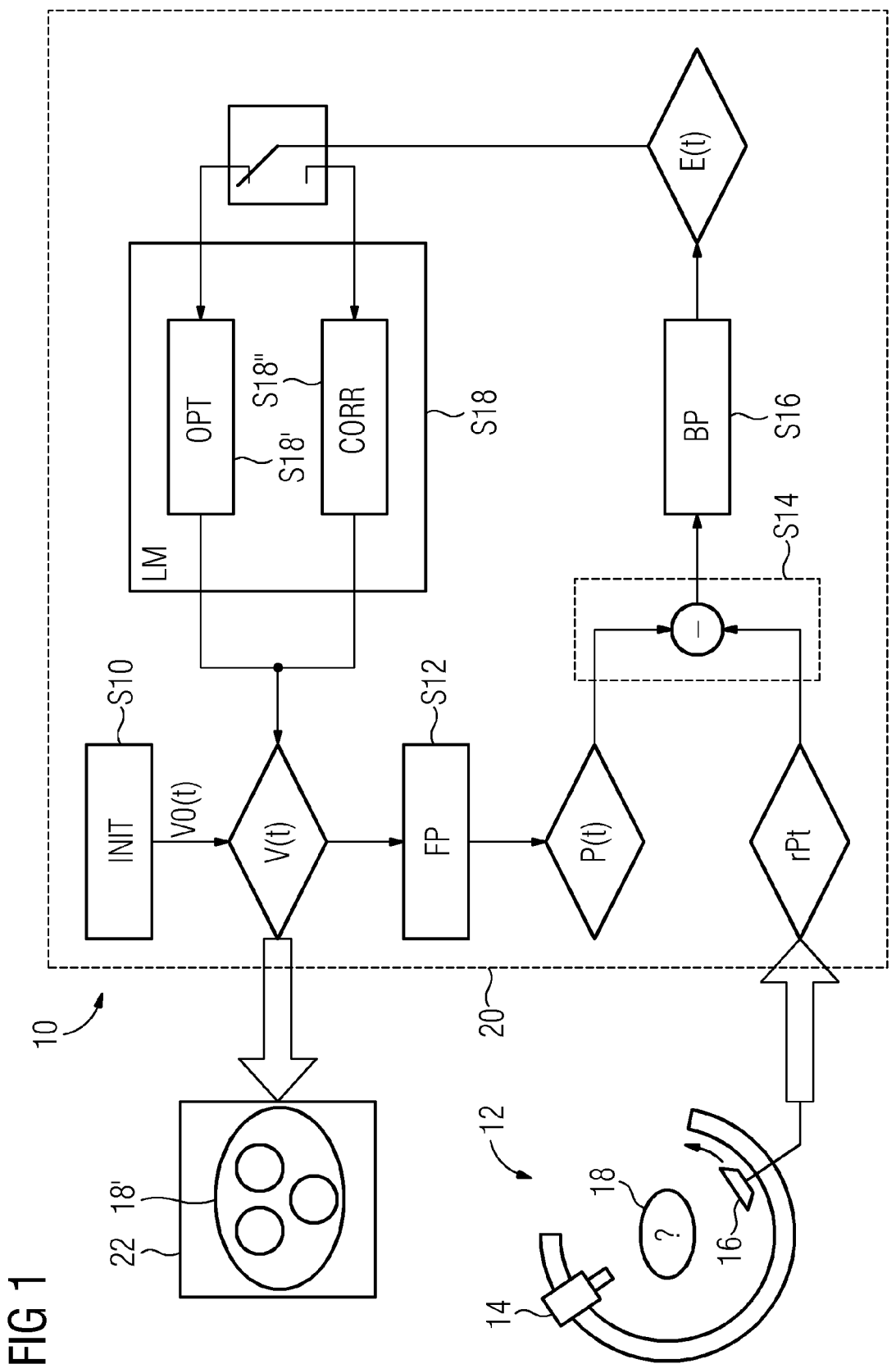
FIG. 1 is a flowchart relating to an embodiment of the method.

FIG. 1 is a flowchart relating to a method 10 for computing time-dependent voxel data V(t) from predefined real projection-image data rP(t). Real projection-image data rP(t) may have been obtained by, for example, a C-arm CAT scanner 12. An x-ray source 14 of a C-arm CAT scanner 12 may have been rotated along with an x-ray detector 16 around a human patient's body 18. The intensity values—registered by x-ray detector 16—of individual pixels of a sensor of x-ray detector 16 are combined in a numeric vector forming real projection-image data rP(t). A sequence of sectional images 18', that will be displayed on a screen 22, of CAT scanner 12 is then computed for the patient's body 18 by a data-processing device 20 of CAT scanner 12.

Real projection-image data rP(t) may have been obtained, for example, in a recording cycle of eight seconds (8 sec) during which a C-arm was swiveled through an angular range of 200° to 210° with projection images being obtained having a uniform angular spacing. The patient may have been injected with a contrast medium during the recording process. The sequence of sectional images 18' will then visualize the perfusion of the contrast medium in the vessels of body 18. The method may be used also for projection-image data that has been recorded in a longer recording cycle, for example forty seconds (40 sec). A projection-image database produced over such a long period of time could not be used in the case of a conventional method for computing voxel data.

Voxel data V(t) for sectional image 18' is iteratively improved by the method 10. At an initializing step S10, a vector is specified having initial voxel data V0(t) and forming at a first iteration step n=0 the vector for voxel data V(t) which means V(t)=V0(t). The initial vector V0(t) is computed on the basis of a dynamic model for the representation of the time-dependent volume data based on a mathematical model describing the dynamic process of concentration variance in the contrast medium in individual volume elements of the body. For that purpose it is possible to use, for example, a gamma-variate function y(t) that includes four model parameters A, B, C, and D:

$$y(t)=A*(t-D)^B*e^{-(t-D)*C} \text{ for } (t-D)>0$$

and $$y(t)=0 \text{ for } (t-D)\leq 0.$$

The values corresponding to the individual recording instants of real projection data rP(t) may be used for time parameter t. The values for model parameters A through D are changed by the method in the manner described below in such a way that on the basis of gamma-variate function y(t) it will be possible using the values obtained for parameters A through D for the individual recording instants to compute voxel data V(t) enabling a sequence of realistic sectional images 18' to be computed. For that purpose, proceeding from the initial vector data V(t)=V0(t), synthetic projection-image data P(t) is first computed in the following manner using a projection matrix Q(t):

$$FP: P(t)=Q(t)*V(t).$$

Projection matrix Q(t) constitutes a projection rule (FP: forward projection) by which the course of recording the real projection-image data rP(t) may be modeled. Each line of projection matrix Q(t) contains weightings for each voxel V(t). The weighting depends on how much of the voxel was irradiated by the x-ray beam at instant t in the respective rotational position of x-ray source 14 and x-ray detector 16. If it is assumed that all of body 18 was in the field of view (FOV) of x-ray source 14 and x-ray detector 16 for a projection image, then the sum of each column of projection matrix Q(t) will be one.

Synthetic projection-image data P(t) is at a step S14 compared with real projection-image data rP(t). One possibility for performing said comparison is to compute projection-error data R(t) as the difference between the projection images' intensity values:

$$R(t)=rP(t)-P(t).$$

Other error computations are possible such as forming the square of the difference.

At an ensuing step S16, a voxel error E(t) is computed for voxel data V(t) as forming the basis of current iteration n. Projection-error data R(t) is for that purpose computed into an error volume by way of a back-projection rule (BP: back projection). The back-projection rule derives from projection matrix Q(t) as transposed matrix $Q^T(t)$:

$$BP: E(t)=Q^T(t)*R(t).$$

For each individual voxel i and for the individual recording instants, an estimation is given in voxel-error data E(t) of error Fi(t) existing between volume data V(t) as produced from the current values of model parameters A through D and true, inaccessible voxel data Vi(t) of individual voxels i:

$$Fi(t)=Vi(t)-y(t)\approx Ei(t),$$

wherein Ei(t) stands for the values from voxel-error data E(t) that belong to a voxel.

For said error Fi(t), an update vector K containing four correction values, each of which is added to one of model parameters A to D, is computed for each voxel i at a step S18 in an optimization phase S18' (OPT: optimization phase) on the basis of a gradient-based optimizing method, for example the Levenberg-Marquardt method. Combining the values—valid for iteration n—of model parameters A to D of a voxel i into a parameter vector G(n) will produce the values for ensuing iteration n+1 as follows:

$$G(n+1)=G(n)+K.$$

Update vector K is computed by solving the following equation provided by the Levenberg-Marquardt method:

$$OPT: (J^T*J+L*I)*K=J^T*Ei(t),$$

wherein J is the Jacobi matrix for estimation error Fi(t) in terms of the four model parameters A to D, matrix I forms the unit matrix, and L indicates the gradation of the gradient-based optimizing algorithm.

Solving said equation for K allows the values for model parameters A to D to be computed as parameter vector G(n+1) and then new voxel data V(t) to be computed for the individual instants at which the projection images were determined.

Be it assumed for the example shown in FIG. 1 that sequence of steps S12 to S18 is executed a total of eight times. Be it further assumed that optimizing algorithm will afterwards have converged to such an extent for there only to be marginal changes in value at step S18 not resulting in any appreciable improvements to voxel data V(t). In order nonetheless to achieve a further improvement, the optimization phase S18' is changed over to a correction phase S18" (CORR: correction phase). The decision whether to execute a correction or optimization step for a specific voxel depends on the magnitude of the values of last update vector K and can be different for each voxel. It is possible to switch between optimization and correction at any time.

Figure 2:
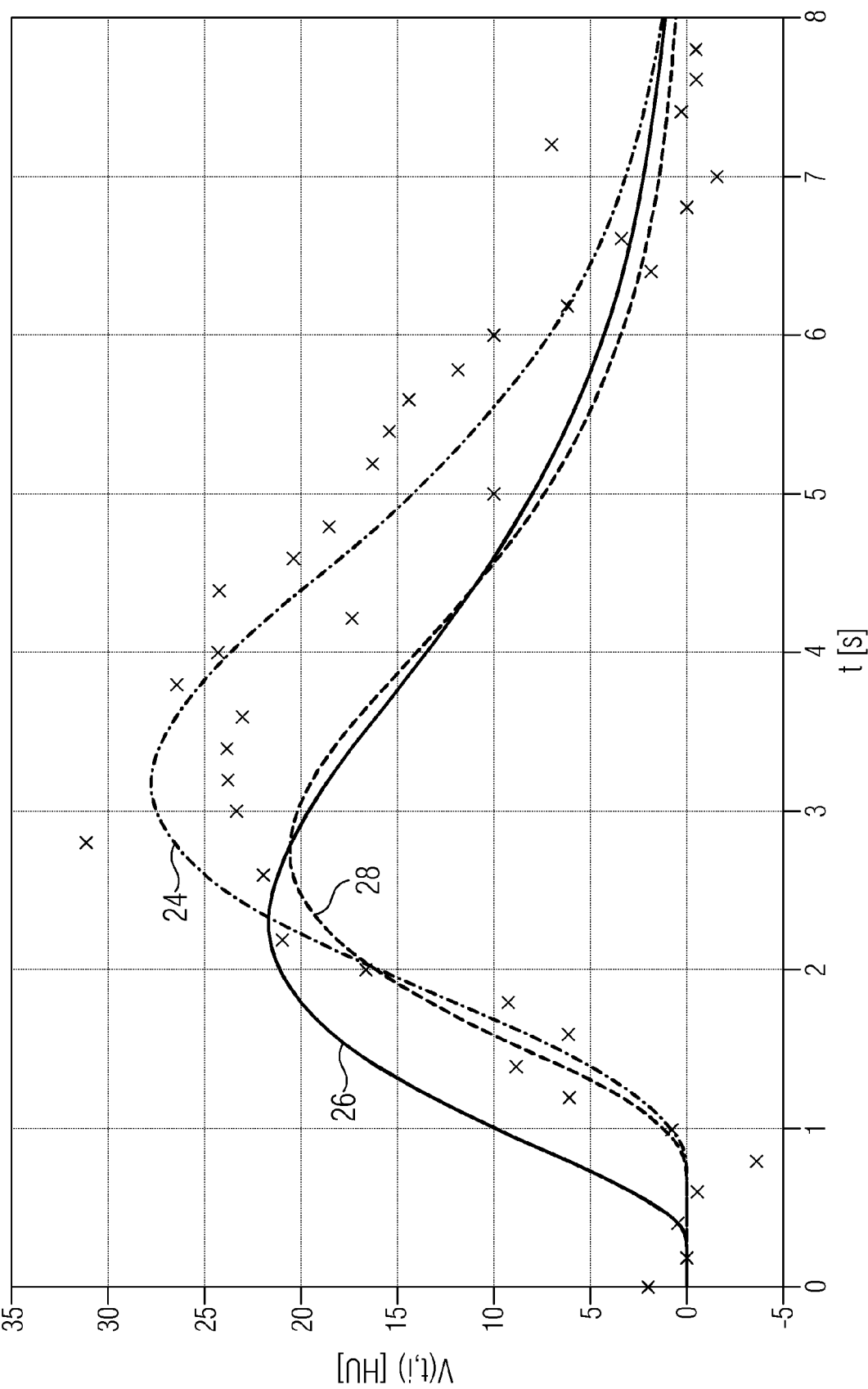
FIG. 2 is a diagram illustrating a correction phase of an embodiment of the method.

Correction phase S18" is explained in more detail below with the aid of FIG. 2. Shown in FIG. 2 for an individual voxel i is voxel data V(t,i) for the individual instants of the 8 sec recording period. Voxel data V(t,i) has here been converted into intensity values, what are termed Houndsfield units HU. What results from gamma-variate function y(t) at the end of the eighth iteration, n=8, is curve 24. Shown for comparison is a true curve 26 as would have to be obtained in the case of an ideal estimation. The correction phase produces (from curve 24) a curve 28 that deviates less from ideal curve 26. Also shown in FIG. 2 is volume-error data Ei(t) plotted in the form of crosses. In order to correct curve 24, in iteration n=9, in the example all values to which Ei(t)<0 applies, are selected for each voxel i from voxel-error data E(t), meaning from Ei(t). The other values of Ei(t) are set to zero. A new update vector K is then computed on the basis of those values only.

Real projection data rP(t) may also include projection-image data for what is termed a mask run consisting of a measuring cycle with no injection of contrast medium. The projection-image data obtained there from may be subtracted from the projection-image data produced during contrast-medium injecting in order to improve the contrast in sectional images 18'. The projection-image data of the mask run can also be used as the basis for a constant offset value y0 for gamma-variate function y(t), for which in this case what applies to (t−D)>0 is:

$$y(t)=y0+A*(t-D)^B*e^{-(t-D)*C}.$$

Iteratively optimizing each voxel value in a volume is very compute-intensive. Parallel computing may help to shorten the algorithm's convergence time. The nature of the method described here renders it capable of a high degree of parallelizing and enables it to be executed in a graphics processor, for instance, by processor cores operating simultaneously in parallel. Thus each voxel may be treated in a separate thread. To drastically reduce the memory requirements, it may be provided to store not the Jacobi matrix J itself but only the product $J^T*J$, from which a 4×4 matrix is produced. Voxel-error data Ei(t) may equally be stored exclusively in the form $J^T*Ei(t)$. Finally, the equation system for computing update vector K may be computed on the basis of a Cholesky decomposition and a forwards-backwards substitution, as a result of which there will be an in-place calculation, which is to say a memory-neutral calculation.

The step size L is initially kept artificially small for the first iterations and only increased as the number of iterations increases.

The example shows how an iterative 4-dimensional ART method for reconstructing volume information for a body is possible even if a computed-tomography system's C-arm may not be rotated fast enough to provide a sufficient number of projection images for temporal processes at every instant. Each voxel's dynamics are here modeled by a gamma-variate function. The parameters for the model are estimated by an optimizing algorithm based on the Levenberg-Marquardt method.

Reconstructing the parameters of the gamma-variate function enables the perfusion and blood flow in the body to be computed. Using a gamma-variate function as a dynamic model means that only the very few values for the model parameters themselves will have to be computed, which makes this method significantly more robust than estimating the entire course of the values on the basis of a PCA. The risk of over-fitting will also be reduced. The method offers extensive scope for parallelizing and may also be executed on graphics processors.

While specific embodiments have been described in detail, those with ordinary skill in the art will appreciate that various modifications and alternative to those details could be developed in light of the overall teachings of the disclosure. For example, elements described in association with different embodiments may be combined. Accordingly, the particular arrangements disclosed are meant to be illustrative only and should not be construed as limiting the scope of the claims or disclosure, which are to be given the full breadth of the appended claims, and any and all equivalents thereof. It should be noted that the term "comprising" does not exclude other elements or steps and the use of articles "a" or "an" does not exclude a plurality.

The invention claimed is:

1. A method of determining volume information of a body, wherein a real projection-image data is produced by a radiation-based projection method, the method of determining volume information comprising:
   specifying initial voxel data for a plurality of voxels of the body,
   generating synthetic projection-image data based upon the initial voxel data with a projection rule modeling a course of the radiation-based projection method,
   comparing the synthetic projection-image data with the real projection-image data and determining projection-error data,
   imaging the projection-error data on the basis of a back-projection rule dependent on the projection rule and generating voxel-error data,
   determining correction data from the voxel-error data by a gradient-based optimizing algorithm, and
   determining corrected voxel data based upon the correction data,
   wherein a sequence of method-specific steps is performed repeatedly, wherein previously determined corrected voxel data is used as initial voxel data in a repeated step, and
   wherein, after the method-specific steps are performed at least once, the correction data is determined in the repeated step only for a subset of the voxel-error data having negative values,
   wherein a mathematical model for describing a time dependency of the voxel data is defined for at least one voxel of the body,
   wherein the model includes at least one model parameter,
   wherein an update vector data is computed by solving the mathematical model,
   wherein the update vector data comprises at least one correction value, and
   wherein the least one correction value is added to the at least one model parameter to generate the corrected voxel data for a further iteration step.

2. The method as claimed in claim 1, wherein the model indicates a mathematical dependency of a contrast-medium concentration on a time parameter and includes a gamma-variate function.

3. The method as claimed in claim 1, wherein projection-image data are available for two projection images recorded under different measuring conditions, wherein projection-image data of a first projection image are subtracted as a baseline from projection-image data of a second projection image or
wherein, from the projection-image data of the first projection image, a constant offset value is determined for a mathematical model which is used to model the projection-image data of the second projection image.

4. The method as claimed in claim 1, wherein the optimizing algorithm is based on the Levenberg-Marquardt method.

5. The method as claimed in claim 1, wherein the initial voxel data are determined based upon a filtered back projection of the real projection-image data.

6. The method as claimed in claim 1, wherein a first value for a step size of the gradient-based optimizing algorithm is set for a predefined number of repetitions of the sequence of method-related steps and a second value that is greater than the first is set for succeeding repetitions.

7. The method as claimed in claim 1, wherein a product formed from the voxel-error data and from a Jacobi matrix is stored in a memory of a data-processing device which performs the method.

8. The method as claimed in claim 1, wherein the correction data are computed from the voxel-error data numerically on the basis of a Cholesky factorization.

9. The method as claimed in claim 1, wherein the corrected voxel data for at least two voxels is computed simultaneously with two different processors.

10. The method as claimed in claim 1, wherein the corrected voxel data are determined for projection-image of a computed tomography or positron-emission tomography.

11. A computed-tomography system, comprising:
a data-processing device, and
an x-ray detector coupled to the data-processing device, wherein a real projection-image data is produced by the x-ray detector, and wherein the data-processing device is configured to execute a method of determining volume information of a body comprising:
specifying initial voxel data for a plurality of voxels of the body,
generating synthetic projection-image data based upon the initial voxel data with a projection rule modeling a course of the radiation-based projection method,
comparing the synthetic projection-image data with the real projection-image data and determining projection-error data,
imaging the projection-error data on the basis of a back-projection rule dependent on the projection rule and generating voxel-error data,
determining correction data from the voxel-error data by a gradient-based optimizing algorithm, and
determining corrected voxel data based upon the correction data,
wherein a sequence of method-specific steps is performed repeatedly, wherein previously determined corrected voxel data is used as initial voxel data in a repeated step,
wherein, after the method-specific steps are performed at least once, the correction data is determined in the repeated step only for a subset of the voxel-error data having negative values,
wherein a mathematical model for describing a time dependency of the voxel data is defined for at least one voxel of the body,
wherein the model includes at least one model parameter,
wherein an update vector data is computed by solving the mathematical model,
wherein the update vector data comprises at least one correction value, and
wherein the least one correction value is added to the at least one model parameter to generate the corrected voxel data for a further iteration step.

12. A non-transitory computer readable medium storing instructions which, when executed on a computer, perform a method of determining volume information of a body, wherein the instructions comprising:
a computer program for:
specifying initial voxel data for a plurality of voxels of the body,
generating synthetic projection-image data based upon the initial voxel data with a projection rule modeling a course of the radiation-based projection method,
comparing the synthetic projection-image data with a real projection-image data obtained from a radiation-based projection method and determining projection-error data,
imaging the projection-error data on the basis of a back-projection rule dependent on the projection rule and generating voxel-error data,
determining correction data from the voxel-error data by a gradient-based optimizing algorithm, and
determining corrected voxel data based upon the correction data,
wherein a sequence of method-specific steps is performed repeatedly, wherein previously determined corrected voxel data is used as initial voxel data in a repeated step,
wherein, after the method-specific steps are performed at least once, the correction data is determined in the repeated step only for a subset of the voxel-error data having negative values,
wherein a mathematical model for describing a time dependency of the voxel data is defined for at least one voxel of the body,
wherein the model includes at least one model parameter,
wherein an update vector data is computed by solving the mathematical model,
wherein the update vector data comprises at least one correction value, and
wherein the least one correction value is added to the at least one model parameter to generate the corrected voxel data for a further iteration step.

* * * * *